United States Patent
Corbellini et al.

(10) Patent No.: US 8,787,345 B2
(45) Date of Patent: Jul. 22, 2014

(54) QUASI FULL-DUPLEX MODE MULTIPOINT VOICE COMMUNICATION SYSTEM

(75) Inventors: Giorgio Corbellini, Grenoble (FR); Emilio Calvanese Strinati, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 110 days.

(21) Appl. No.: 13/326,975

(22) Filed: Dec. 15, 2011

(65) Prior Publication Data

US 2012/0170529 A1 Jul. 5, 2012

(30) Foreign Application Priority Data

Dec. 29, 2010 (FR) ...................................... 10 61331

(51) Int. Cl.
*H04J 3/00* (2006.01)
(52) U.S. Cl.
USPC ............................ 370/345; 370/235; 370/329
(58) Field of Classification Search
USPC ....................... 370/235, 235.1, 329, 336, 337, 370/345–348
See application file for complete search history.

(56) References Cited

U.S. PATENT DOCUMENTS

| | | | | |
|---|---|---|---|---|
| 6,157,614 A * | 12/2000 | Pasternak et al. | ............. | 370/236 |
| 6,760,305 B1 * | 7/2004 | Pasternak et al. | ............. | 370/230 |
| 7,443,830 B2 * | 10/2008 | Engels et al. | ................. | 370/347 |
| 7,463,886 B2 * | 12/2008 | Salokannel et al. | ........ | 455/426.1 |
| 7,974,246 B1 * | 7/2011 | Fulthorp et al. | ............... | 370/337 |
| 2004/0213174 A1 * | 10/2004 | Engels et al. | ................. | 370/328 |
| 2006/0045134 A1 * | 3/2006 | Eldon et al. | .................... | 370/503 |
| 2007/0104121 A1 | 5/2007 | Shaffer et al. | | |
| 2007/0105579 A1 | 5/2007 | Shaffer et al. | | |
| 2008/0171567 A1 | 7/2008 | Kossi et al. | | |
| 2012/0157205 A9 * | 6/2012 | Danieli et al. | .................. | 463/36 |

OTHER PUBLICATIONS

European Search Report issued Mar. 7, 2012 in Patent Application No. EP 11 19 4268.

* cited by examiner

*Primary Examiner* — Kerri Rose
(74) *Attorney, Agent, or Firm* — Oblon, Spivak, McClelland, Maier & Neustadt, L.L.P.

(57) ABSTRACT

The present invention relates a voice communication method between a plurality of users sharing the same transmission band. The resource is accessed by time division under the supervision of a control node. During a polling step, any user wishing to speak transmits (210) a request to the control node. The control node allocates (220) transmission frames to the requesting users or merely to some of these users. Users allocated a transmission frame can then transmit (230) a voice packet to the respectively allocated frames thereof. The transmission frames are interleaved temporally so as to give the impression of full-duplex communication during voice reproduction.

15 Claims, 6 Drawing Sheets

QUASI FULL-DUPLEX MODE MULTIPOINT VOICE COMMUNICATION SYSTEM

FIELD OF THE INVENTION

The present invention relates generally to a voice communication system for interconnecting a plurality of users.

STATE OF THE RELATED ART

Voice communication systems for a group of users are known in the professional sector or in that of rescue. For example, the PMR (acronym of Professional Mobile Radio or Private Mobile Radio) system operates around 446 MHz and offers "walkie-talkie" type services. The narrow band of the system (12.5 kHz) does not allow more than one user to talk at once. The communication is half-duplex type with a "Push to Talk" function, the switch from reception mode to transmission mode being made by pressing a button on a radio terminal.

A digital version of the PMR system, known as DMR (Digital private Mobile Radio) is currently being standardised. A description thereof is particularly found in the documents ETSI TS 102 36 and ETSI TS 102 398 available on the site www.etsi.org. This system also uses narrowband channels (12.5 kHz) and enables half-duplex type communications.

As a general rule, most of the voice communication systems known from the prior art use few transmission resources (for example low bandwidth) such that full-duplex communication can hardly be envisaged. Moreover, the majority of these systems only enable point-to-point communication, in other words, at a given time, only two users from the group can communicate with each other. Finally, they involve the drawback of requiring a manual operation on a radio terminal (pressing a button) whenever a user from the group wishes to speak to another user. This manual operation may be inconvenient, hazardous or even impossible during some rescue missions.

The aim of the present invention is consequently that of proposing a voice communication system remedying the abovementioned drawbacks.

DESCRIPTION OF THE INVENTION

The present invention is defined by a voice communication method between a plurality of users equipped with radio terminals, referred to as user nodes, wherein the user nodes access a common transmission resource, controlled by a control node, the access to said resource being organised in time frames, each time frame comprising:
  a first period, referred to as the polling period, during which the user nodes having a voice packet to transmit send the control node an access request;
  a second period, referred to as the allocation period, during which the control node allocates transmission frames to all or part of the set of user nodes having transmitted an access request in the previous step, each transmission frame consisting of a plurality of transmission intervals, said frames being interleaved over time;
  a third period, referred to as the transmission period, during which each user node allocated a transmission frame in the previous step, transmits said voice packet in the allocated transmission frame thereof.

The first period may be split into basic polling intervals, each user node having a specific basic polling interval and, if said node has a voice packet to transmit, sends the access request thereof during said interval.

Advantageously, the basic polling intervals are initially scheduled using MAC identifiers of the user nodes, said scheduling being known to the control node and the user nodes.

This scheduling may be the subject of a permutation at each time frame, the permutation law being known to the control node and the user nodes.

The access request may comprise a degree of priority of access to said resource, which may in turn be dependent on the user voice volume.

Each user node advantageously comprises a transmission buffer and transmits an access request in the basic polling interval thereof if a voice packet is present in said buffer.

Alternatively, each user node comprises a transmission buffer and systematically transmits an access request in the basic polling interval thereof, the degree of priority being null in the absence of a voice packet in said buffer and being non-null otherwise.

The control node preferably broadcasts to all the user nodes, during the allocation period, an allocation message specifying to each user node having transmitted an access request during the previous polling period, the transmission frame rank allocated in the transmission period.

According to a first alternative embodiment, the control node only allocates transmission frames up to a predetermined number of user nodes having made an access request.

According to a second alternative embodiment, the control node determines a maximum number, $N_s$, of user nodes suitable for transmission frame allocation, said maximum number being determined by the largest integer $N_s$ verifying:

$$PP + AP + N_{frame} \sum_{i=1}^{N_s} T_{f,i} \leq T_F$$

where $T_F$ is the duration of the time frame, $T_{f,i}$ that of the transmission frame of the user i, PP is the duration of the polling period, AP is the duration of the allocation period, $N_{frame}$ is the number of interleaved transmission frames, an interleaved transmission frame consisting of time-based interleaving of the user node transmission frames.

Advantageously, during the transmission period, each user node allocated a transmission frame during the previous allocation step broadcasts the voice packet thereof to all the user nodes.

The control node may also be a user node.

Prior to any communication, an initialisation step is preferably performed comprising:
  a step for automatically detecting (automatic discovery) user nodes by exchanging the respective MAC addresses thereof;
  a step for electing a control node from the user nodes;
  a step for synchronising the user nodes with the elected control node.

The control node may associate, with each user node MAC address, a MAC address ID, and then broadcasts to all the user nodes a message containing the MAC address of each user node and the associated MAC address ID.

BRIEF DESCRIPTION OF FIGURES

Further features and advantages of the invention will emerge on reading a preferential embodiment of the invention, with reference to the attached figures wherein.

DETAILED DESCRIPTION OF PARTICULAR EMBODIMENTS

A network of radio terminals, hereinafter referred to as user nodes, is considered hereinafter. The network also comprises a node responsible for coordinating the network, referred to as the control node. The control node may be a specific user node of the network. This will particularly be the case in a cooperative network, where all the nodes have the same structure and where each node may be called upon to act as the control node. Alternatively, the control node may be a dedicated node, exclusively responsible for coordinating the network. This will particularly be the case in a cellular network wherein the control node will be a base station.

It will be assumed hereinafter, as an illustration and without prejudicing any generalisation, that the network is cooperative and that the control node is also a user node of the network.

We will also make the assumption that communications on the network use a narrow transmission band and that users access this resource via Time Division Multiple Access (TDMA). In other words, the transmission resources of the various users are Time Transmission Intervals (TTI) during which they can transmit in the band in question.

The implementation of the voice communication method according to the invention is based on the assumption that the network has been previously initialised. However, it should also be noted that this initialisation step is not part of the invention per se.

Figure 1:
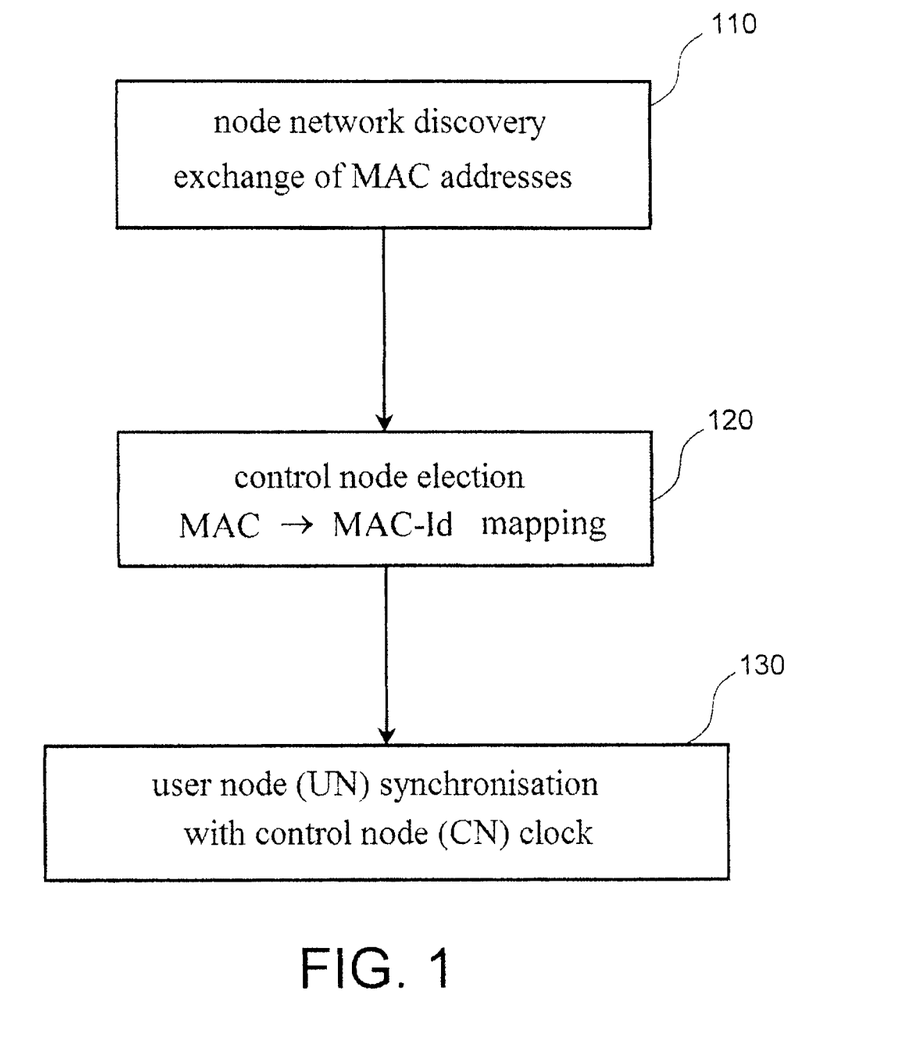
FIG. 1 schematically illustrates an initialisation phase prior to the implementation of the voice communication method according to one embodiment of the invention.

FIG. 1 illustrates said initialisation step in a cooperative network.

This initialisation step may be started when the radio terminal of any user is switched on.

In a first phase, 110, automatic network discovery is carried out by each of the nodes. At this stage, the various nodes exchange the MAC addresses thereof and, if applicable, some of the features thereof. These exchanges are carried out by asynchronous mode packet transmission. In the event of collision, the packets are retransmitted until all the nodes have been mutually recognised.

In step 120, the control node is elected according to a predetermined rule. The handover of control to this node advantageously gives rise to the broadcast of a message to all the network nodes specifying the identity of the control node, typically the MAC address thereof.

In step 130, the user nodes are synchronised with the control node. For this purpose, the control node broadcasts, for example, a synchronisation packet to all the network nodes. The user nodes are synchronised using this packet on the control node clock.

Following the initialisation step, each node knows the size of the network (number of users) and the MAC addresses of the other nodes. To simplify subsequent exchanges, a node identifier (referenced MAC-Id) encoded on some bits (for example a quadruplet) is advantageously associated biunivocally with each MAC address. This association may be centralised by the control node and declared to the user nodes by a packet containing the MAC address of the node and the MAC-Id identifier thereof.

Various alternative embodiments of the initialisation step may be envisaged by those skilled in the art without leaving the scope of the present invention. In particular, it is conceivable that a particular user node can be configured as the control node using a configuration switch provided on the radio terminal. Synchronisation may be carried out by grouping all the terminals in a single location and activating said synchronisation manually. A dedicated control node may act as a docking station, the various terminals being connected to said docking station and synchronised therewith.

Figure 2:
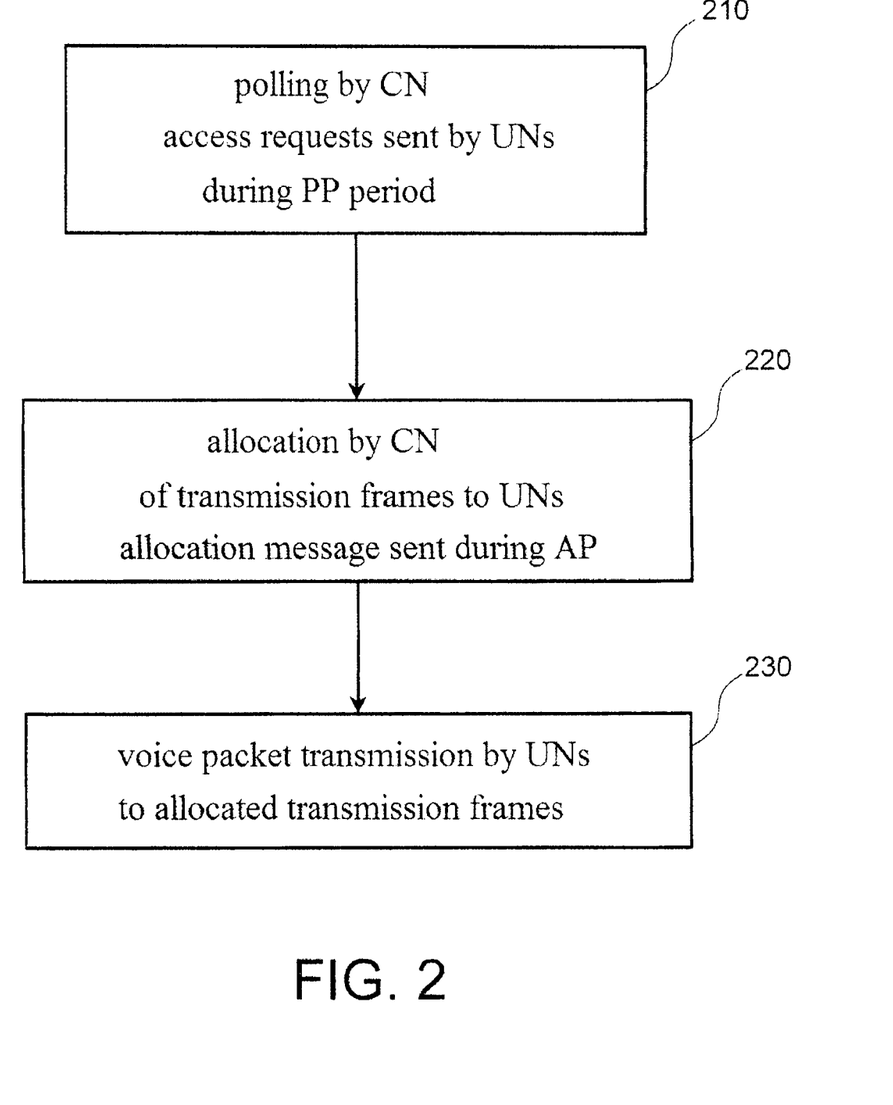
FIG. 2 schematically illustrates the voice communication method according to one embodiment of the invention.

FIG. 2 represents the main steps of the voice communication method according to an embodiment of the invention.

Access to the common transmission resource is organised by splitting the time into consecutive time frames, each frame comprising a first period, referred to as the polling period, a second period referred to as the allocation period, and a third period referred to as the transmission period.

In step 210, during the polling period (PP), the control node receives transmission resource access requests from various user nodes. More specifically, the polling period is in turn split into basic intervals, referred to as basic polling intervals, each user node having an interval suitable for transmitting a resource access request. The order of these intervals in the polling period is known by the user nodes and the control node via a predetermined convention. For example, the order of these intervals may be the increasing or decreasing order of the MAC-Id identifiers assigned during the initialisation step. However, this order may then be modified by the control node as explained hereinafter.

In step 220, the control node allocates transmission frames to the user node having requested access in step 210. As a general rule, the allocation may not satisfy the $N_r$ user nodes having transmitted an access request, with the possibility of servicing a plurality $N_s$, where $N_s \leq N_r$. The number $N_s$ may be fixed or calculated by the control node as explained hereinafter.

A transmission frame consists of a plurality of transmission intervals, said intervals being obtained by splitting the transmission period. The transmission frames allocated to various user nodes are interleaved.

The allocation of transmission frames may account for the priority levels of the various users. After carrying out this allocation, the control node broadcasts an allocation message to all the user nodes during the allocation period (AP).

In step 230, the user nodes to which the transmission frames have been allocated transmit the respective voice packets thereof by means of said frames during the transmission period (TP).

The voice communication method is continued by returning to the first step.

Figure 3:
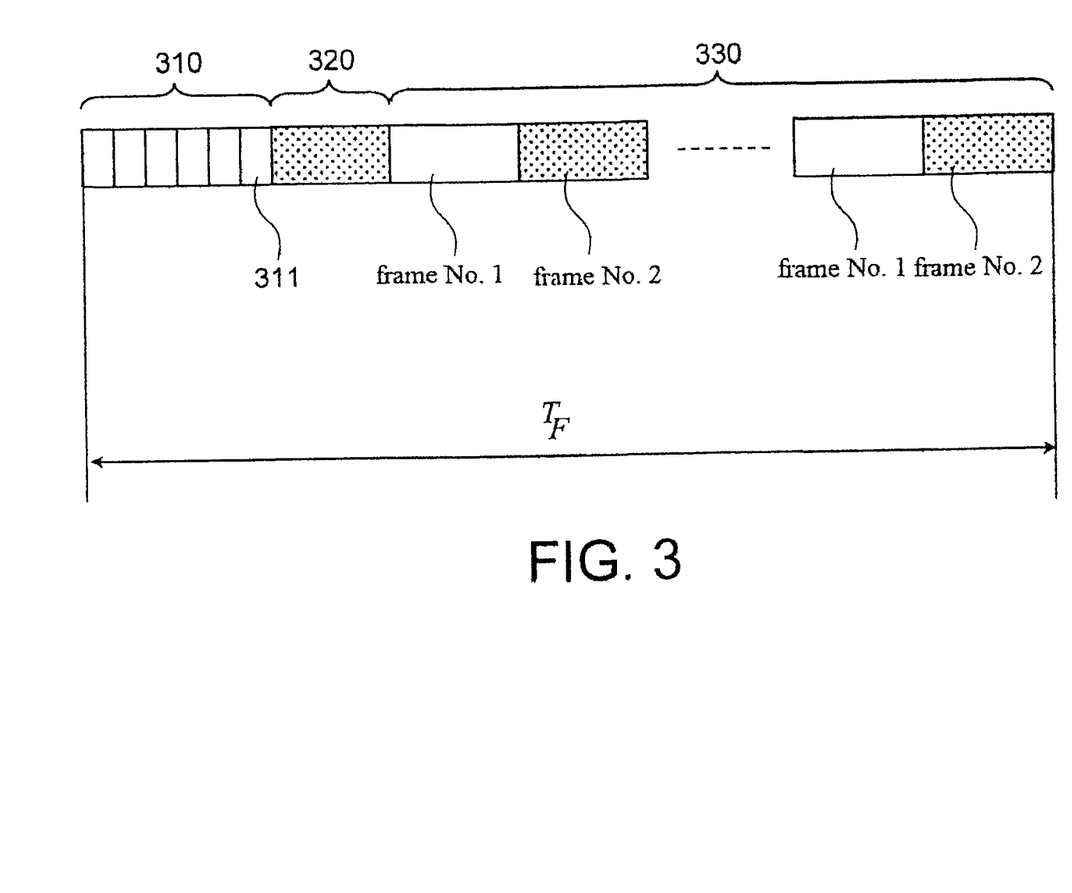
FIG. 3 schematically represents the structure of a time frame used within the scope of the present invention.

FIG. 3 schematically represents the structure of a time frame used within the scope of the present invention.

As specified above, the time frame comprises a polling period (PP), 310, an allocation period, 320, and a transmission period 330.

The polling period, 310, is split into a number of basic intervals, 311, corresponding to the number of user nodes. During the assigned basic interval, a user node may transmit an access request to the control node.

The allocation period (AP), 320, is used by the control node to broadcast an allocation message to all the user nodes.

The transmission period (TP), 330, comprises a plurality $N_{frame}$ of interleaved transmission frames, each frame consisting of a plurality $N_s$ of transmission intervals, one for each user node. It has been assumed in this case that $N_s=2$, in other words that only two users were authorised to communicate during the transmission period. The frames are classified according to rank, the rank of a frame being the rank of the first transmission frame thereof. In this way, in the case illustrated, the first frame consists of transmission intervals, shown in clear format, having an odd rank and the second frame consists of transmission intervals, shown in shaded format, having an even rank.

Although only one user can transmit for a given transmission interval, it is understood that the nesting of the frames is conveyed by the perception of two "simultaneous" half-duplex communications, in other words, one full-duplex communication. The degree of fragmentation of the frame selected is sufficiently high such that the voice reproduction contains no gaps.

As a general rule, if $T_F$ is the total duration of the time frame, $T_{f,i}$ the duration of the voice packet transmitted by the user i, the maximum number $N_s^{max}$ of "simultaneous" half-duplex communications is given by the largest integer $N_s$ verifying the equation:

$$PP + AP + N_{frame} \sum_{i=1}^{N_s} T_{f,i} \leq T_F \quad (1)$$

Where:

$$T_{f,i} = \frac{\eta_i \cdot k_i \cdot \rho_i}{\gamma_i} + \alpha \quad (2)$$

and where:

PP is the duration of the polling period, AP is the duration of the allocation period; $\eta_i$ is the time duration of each basic voice interval, $k_i$ is the number of basic voice intervals per user, $\rho_i$ is the voice compression ratio, $\gamma_i$ is the speed used by the user node i, and $\alpha$ is a time margin required in practice for the transmission of each voice packet. The voice stream from each user is split into a plurality of basic frames and each voice packet transmitted during a transmission interval contains a plurality of basic frames.

After voice packet demodulation and decoding, the following equation must be satisfied so that the voice signal does not contain gaps during reproduction:

$$\eta_i \cdot k_i \cdot N_{frame} \geq T_F \quad (3)$$

Equation (3) means that, after voice packet demodulation and decoding, the voice signal reproduction time of each user cannot be less than the length $T_F$ of a time frame.

Figure 4:
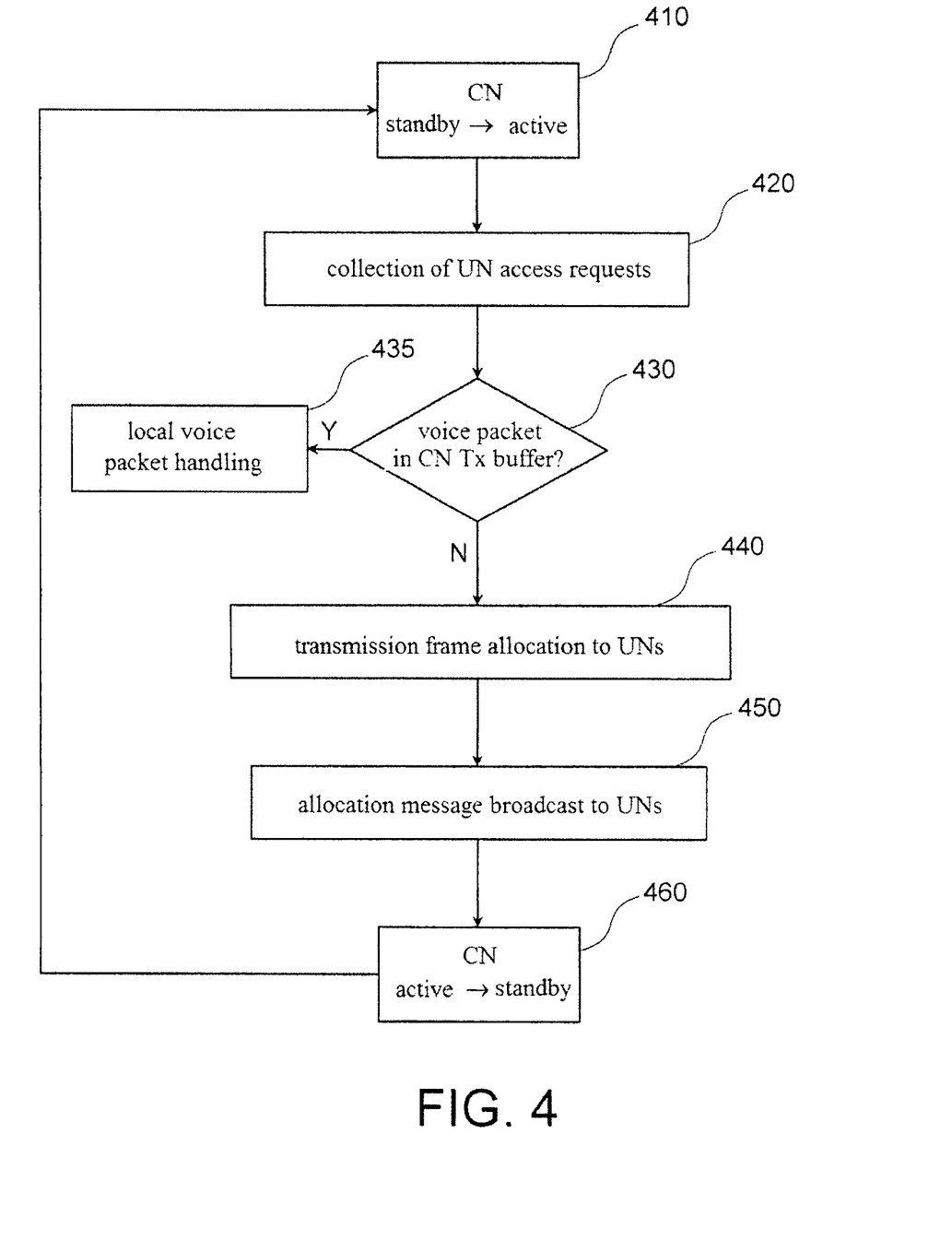
FIG. 4 schematically illustrates the implementation of said method by the network control node.

FIG. 4 illustrates the embodiment of the voice communication method by the control node.

In step 410, at the start of the polling period, the control node switches from the standby state to the active state.

In step 420, throughout the polling period, the control node collects the access requests transmitted by the various user nodes. These requests may specify the degree of priority of the requested access.

Step 430 is optional and relates to the scenario whereby the control node is also a user node, i.e. a radio terminal of one of the network users. In this case, the control node verifies whether a voice packet is present in the transmission buffer thereof. If this is the case, the control node access request is handled locally in 435. Otherwise, no access request is generated.

In step 440, the control node allocates the transmission frames. This allocation may account for degrees of priority, if specified in the access requests. Alternatively or secondarily, the allocation may account for a degree of priority implicitly supplied by radio terminal type (encoded in the MAC address). When a plurality of users has the same degree of priority, transmission frames are allocated at random within said plurality. Following this step, the user nodes having made the request, or merely some of said nodes (up to $N_s$) are allocated a transmission frame.

In step 450, the control node broadcasts to all the user nodes an allocation message specifying to each user node in question the rank of the allocated transmission frame thereof. More specifically, this message advantageously contains a correspondence between the identifiers of the user nodes (MAC-Ids) and the ranks of the transmission frames. It is understood that, if the control node is also a user node, the allocation message does not contain the allocation information for the control node but that this information is stored locally.

In step 460, the control node switches from the active state to the standby state until the start of the following polling period. However, if the control node is also a user node, the standby state is interrupted to transmitting the specific voice packet thereof (or to receive voice packets from other users). The control node is then in the active state during packet transmission and immediately switches back to the standby state until the start of the next polling period.

Figure 5:
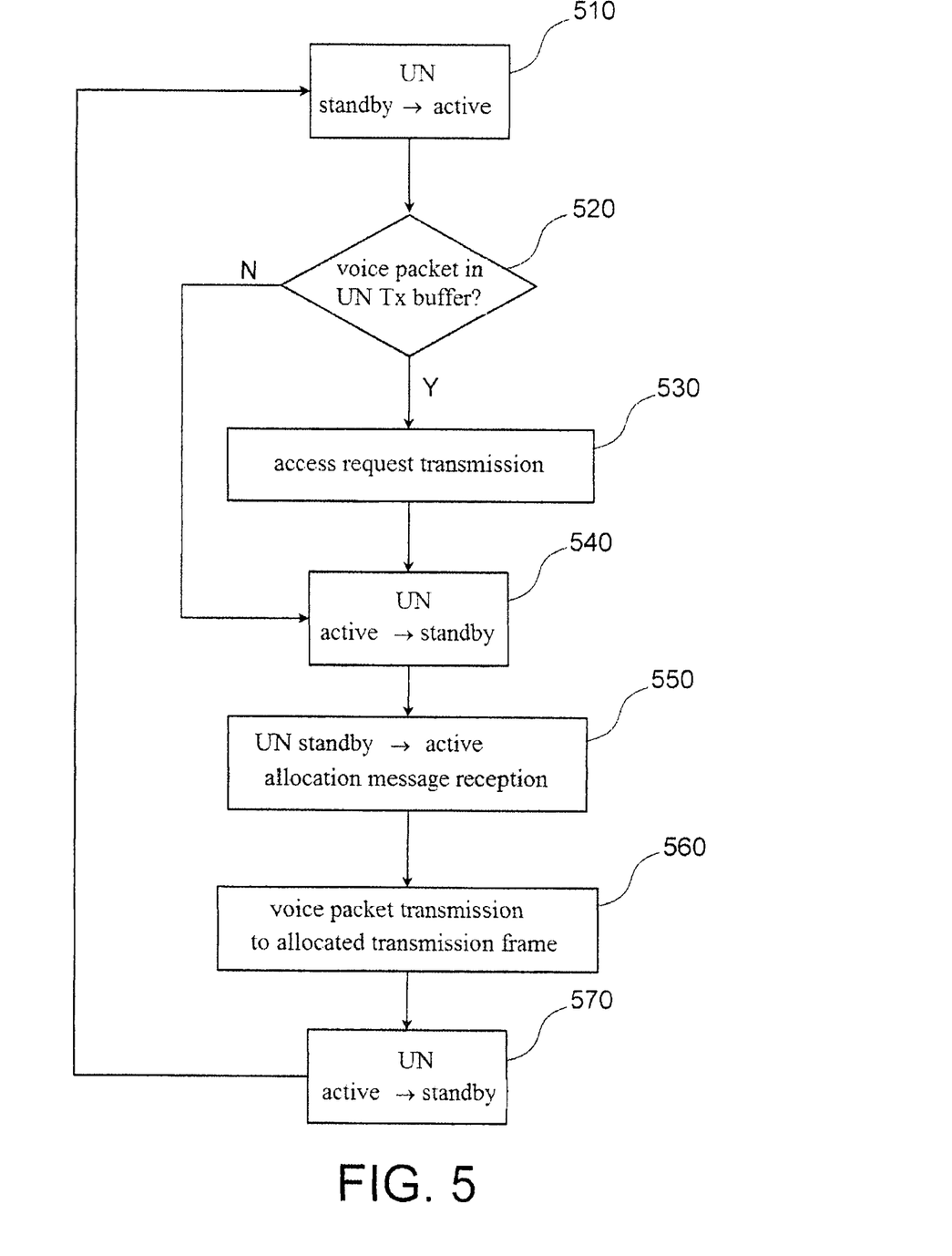
FIG. 5 schematically illustrates the implementation of said method by a network user mode.

FIG. 5 illustrates the implementation of the voice communication method by a user node (other than the control node).

At the start of the polling period, the user node switches from the standby state to the active state in 510. It determines in 520 whether a voice packet is to be transmitted in other words, whether a voice packet is present in the transmission buffer thereof.

In the absence of a packet to be transmitted, it returns to the standby state in 540 until the start of the allocation period. On the other hand, if a voice packet is to be transmitted, the user node transmits, in step 530 the access request thereof during the allocated basic polling period. At the start of the communication, this allocation is preferably a predetermined function of the MAC-Id identifier. This allocation may nonetheless be subsequently modified as explained hereinafter.

The access request advantageously comprises a degree of priority specified by the user. For example, the degree of priority may be an increasing function of the voice volume. Once the access request thereof has been transmitted, the user node switches back to the standby state in 540, until the start of the allocation period.

In 550, the user node switches from the standby state to the active state at the start of the allocation period. It receives the allocation message broadcast by the control node. It determines on the basis of this message whether a transmission frame has been allocated for the current time frame and, if so, the rank of said transmission frame.

In step 560, the user node transmits the voice packet thereof during the allocated transmission frame thereof. More specifically, it splits this packet and transmits it during the transmission intervals forming the frame in question. It simultaneously receives the voice packets from the other ($N_s$−1) user nodes. Following the final transmission frame, the user node switches to standby mode in 570, until the start of the next polling period.

As mentioned above, the allocation, or more specifically the initial scheduling of the basic polling intervals is preferably performed according to the MAC identifiers (MAC-Id). This scheduling may be constant throughout the communication.

According to one advantageous embodiment, the scheduling of the basic polling intervals will be interchanged at each polling interval to statistically reduce the voice packet time lags.

Fixed scheduling gives priority to user nodes allocated with the polling intervals closest to the start of the allocation period. In this way, a voice packet stored in the transmission buffer of a user node during the polling period will be taken into account if the basic polling interval thereof is the last of said period whereas it will not be taken into account if the basic polling interval thereof is the first of said period. In the latter case, the allocation request will not be transmitted during the current polling period but merely during the next polling period. In other words, the voice packet time lag will be increased by at least the time AP+TP (duration of the allocation period plus the duration of the transmission), which may be penalising.

The abovementioned alternative embodiment interchanges the scheduling of the basic polling intervals. The permutation law may be egalitarian, such as a circular permutation for each time frame, or give priority to certain priority user nodes.

The permutation law is preferably known by all the user nodes. In this way, each user node knowing the initial scheduling and the permutation law is capable of determining, for each time frame, the allocated basic polling interval thereof. In the event of a variation in the number of user nodes, the control node carries out a further initialisation of the scheduling on the basis of the MAC identifiers (Mac-Id) of the nodes present in the network.

Figure 6A:
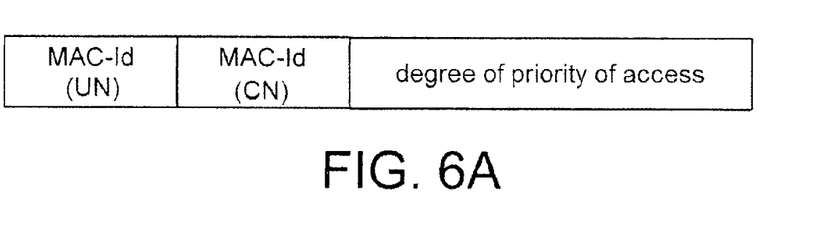
FIG. 6A represents an example of structure of a packet used in a first step of said voice communication method.

FIG. 6A represents the format of an access request packet. The packet comprises a first part wherein the MAC identifier (MAC-Id) of the user node from which the request originated is stored, a second part containing the MAC identifier of the control node, the recipient of the request and, if applicable, a third part containing the degree of priority of the access.

According to one particular example of an embodiment, all the user nodes, including those wherein the transmission buffer is empty, transmit an access request during a polling period. However, if the transmission buffer is empty, the degree of priority is conventionally set to 0 and the request is not handled. This enables the control node to make a distinction between an access request packet that has not reached the destination thereof (facing of transmission channel for example) and an absence of a request from a user node.

Figure 6B:
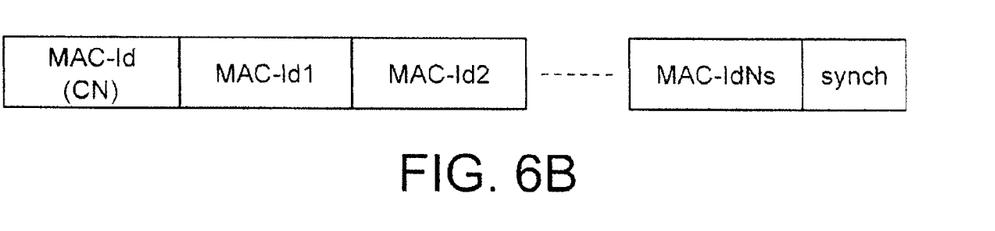
FIG. 6B represents an example of structure of a packet used in a second step of said voice communication method.

FIG. 6B represents the format of an allocation message packet.

It should be noted that this message is transmitted by the control mode to indicate to the user nodes the allocated transmission frames thereof.

The packet comprises a header containing the MAC identifier of the control node, from which the message originated, a plurality of MAC identifiers, the order whereof indicates the ranks of the transmission frames respectively allocated thereto: the first frame is allocated to the user node identified as MAC-Id1, the second to that identified as MAC-Id2, and so on.

If applicable, the packet may also contain synchronisation information, specifically indicating the start of the transmission period. By default, the start of the transmission period coincides with the end of the allocation period.

Figure 6C:
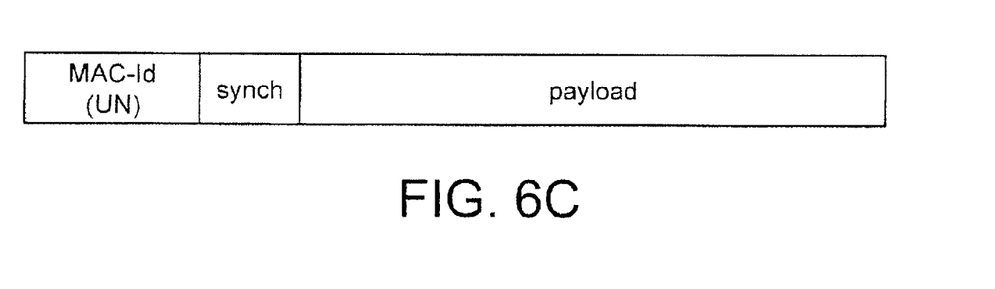
FIG. 6C represents an example of structure of a packet used in a third step of said voice communication method.

FIG. 6C schematically represents the format of a voice packet.

This packet comprises a header containing the identifier of the user node from which the packet originated, and the payload per se. If applicable, as specified in the figure, the packet may comprise synchronisation information indicating when the voice packet was generated, so as to enable the temporal alignment thereof during the reproduction thereof.

As a general rule, a user node transmits the voice packet thereof to all the user nodes of the network, such that each node can reproduce all the current communications. According to one alternative embodiment, each node can select the user(s) for listening. It is simply necessary to filter the voice packets wherein the headers contain the MAC-Id identifiers of the selected users.

The invention claimed is:

1. Voice communication method between a plurality of users equipped with radio terminals as user nodes, which access a common transmission resource and are controlled by a control node, the access to said resource being organised in time frames, the method comprising:
   in a first period of each time frame, performing a polling period, during which the user nodes having a voice packet to transmit send the control node an access request;
   in a second period of each time frame, performing an allocation period, during which the control node allocates transmission frames to all or part of the user nodes having transmitted an access request in the first period, each transmission frame allocated to a user being fragmented into a plurality of transmission intervals; and
   in a third period of each time frame, performing a transmission period, during which each user node allocated a transmission frame in the second period, transmits said voice packet in the allocated transmission frame thereof, transmission frames allocated to different users being interleaved within said transmission period so as to ensure simultaneous half-duplex communications of the different users.

2. Voice communication method according to claim 1, wherein the first period is divided into basic polling intervals, each user node having a specific basic polling interval and, if a user node has a voice packet to transmit, the user node having a voice packet sends the access request thereof during said interval.

3. Voice communication method according to claim 2, wherein the basic polling intervals are initially scheduled using MAC IDs of the user nodes, said scheduling being known to the control node and the user nodes.

4. Voice communication method according to claim 3, wherein the scheduling is the subject of a permutation at each time frame, a permutation law of said permutation being known to the control node and the user nodes.

5. Voice communication method according to claim 2, wherein the access request comprises a degree of priority of access to said resource.

6. Voice communication method according to claim 5, wherein that the degree of priority is dependent on the user voice volume.

7. Voice communication method according to claim 2, wherein each user node comprises a transmission buffer and transmits an access request in the basic polling interval of the user node if a voice packet is present in said buffer.

8. Voice communication method according to claim 2, wherein each user node comprises a transmission buffer and systematically transmits an access request in the basic polling interval of the user node, the degree of priority being null in the absence of a voice packet in said buffer and being non-null otherwise.

9. Voice communication method according to claim 2, wherein the control node broadcasts to all the user nodes, during the allocation period, an allocation message specifying to each user node having transmitted an access request during the previous polling period, the transmission frame rank allocated in the previous transmission period.

10. Voice communication method according to claim 9, wherein the control node only allocates transmission frames at a rate of a predetermined number of user nodes having made an access request.

11. Voice communication method according to claim 9, characterised in that the control node determines a maximum number, $N_s$, of user nodes suitable for transmission frame allocation, said maximum number being determined by the largest integer $N_s$ verifying:

$$PP + AP + N_{frame} \sum_{i=1}^{N_s} T_{f,i} \leq T_F$$

where $T_F$ is the duration of the time frame, $T_{f,i}$ is the duration of the transmission frame of the user i, PP is the duration of the polling period, AP is the duration of the allocation period, $N_{frame}$ is the number of interleaved transmission frames, an interleaved transmission frame consisting of a time-based interleaving of the user node transmission frames.

12. Voice communication method according to claim 1, wherein during the transmission period, each user node which has been allocated a transmission frame during the previous allocation step, broadcasts the voice packet thereof to all the user nodes.

13. Voice communication method according to claim 1, wherein the control node is also a user node.

14. Voice communication method according to claim 1, wherein prior to any communication, an initialisation step is performed, the initialization step comprising:

automatically detecting user nodes by exchanging the respective MAC addresses of the user nodes;

electing a control node from the user nodes detected;

synchronising the detected user nodes with the thus elected control node.

15. Voice communication method according to claim 14, wherein the control node associates, with each user node MAC address, a MAC address ID, and then broadcasts to all the user nodes a message containing the MAC address of each user node and the associated MAC address ID.

* * * * *